United States Patent Office 3,055,876
Patented Sept. 25, 1962

3,055,876
SUSPENDING AGENTS FOR VINYL
POLYMERIZATION
Leonard C. Grotz, Waukesha, Wis., assignor to Union
Carbide Corporation, a corporation of New York
No Drawing. Filed May 19, 1960, Ser. No. 30,077
14 Claims. (Cl. 260—87.1)

This invention relates to a process for the polymerization of certain vinyl monomers. More particularly, this invention relates to the use of a specific type of suspending agent for the polymerization of vinyl monomers in a non-emulsified, aqueous suspension.

Suspension polymerization, also called "pearl," "bead," or "granular" polymerization, is carried out by mixing one or more water-insoluble monomers and a polymerization catalyst with water and maintaining a dispersion by continuous, vigorous agitation while maintaining the resulting mixture at polymerization temperatures. Although this type of polymerization permits simple polymer recovery procedures and produces polymers having desirable properties for some applications, there exists one major drawback. The monomers, when polymerizing, have a tendency to pass through a sticky and agglomerative condition and the polymer particles tend to cling together, forming large polymeric aggregates of non-uniform sizes. Furthermore, because of the low rate of heat transfer through the large polymer aggregates formed, high temperatures prevail at the center of the agglomerates, due to the heat of polymerization, and low molecular weight polymers result in the interior of the agglomerates. At the same time, high molecular weight polymers are formed on the surface of the agglomerates where the reaction medium provides adequate surface cooling of the polymers. Polymers having such variation, both in particle size and in molecular weight, are undesirable for commercial use for one or more of the following reasons: the polymer aggregates may be too large to be handled by the processing equipment, finished polymeric products may be excessively discolored due to the necessity for high processing temperatures in order to melt the large aggregates, plasticized formulations may exhibit excessive "fisheye" formation or rugosity or both due to non-uniform plasticization which in turn result in poor physical properties of calendered and extruded products, polymers may exhibit low rates of solution or form solutions containing insoluble gels which preclude their use in applications such as coatings or films, plasticized or unplasticized formulations may have low extrusion rates or poor molding characteristics, or the polymers may exhibit poor film forming behavior.

In addition to the poor physical properties of the polymers, a second problem is caused by the agglomerative tendency of the polymer particles during the polymerization reaction. The sticky particles tend to coat reaction vessels and other equipment, forming a hard coating known as "ivory." This coating, in addition to reducing the polymer yield to a certain extent, clogs up equipment, thus necessitating extensive, expensive cleaning operations. This coating may also flake off and, together with the over size polymeric particles formed by agglomeration, forms "scrap" or polymeric material that will not pass through a No. 4 mesh screen.

Attempts to prevent particle agglomeration that have been made in the past have not been entirely successful. For example, increasing the amount of agitation only increases the opportunities for agglomeration and, in such instances, when polymerization is nearly complete, the rapid agitation tends to grind the hard polymer particles to a fine powder. Other attempted solutions have been directed toward the use of suspending agents to provide a more stable suspension, and include thickening the aqueous phase with natural or synthetic gums, using emulsifying agents at concentrations too low to form stable emulsions, or employing various organic and inorganic substances as protective colloids to isolate the polymer particles from each other. These suspending agents include, for example, maleic acid-styrene copolymers, partially hydrolyzed poly(vinyl acetate), pectins, methyl cellulose, carboxymethyl cellulose, gelatin, insoluble inorganic compounds such as bentonite (sodium montmorillonite) and calcium sulfate, urea-formaldehyde resins, soluble starch, methyl hydroxylpropyl cellulose, and phenol-formaldehyde resins. In addition, various emulsifiers or wetting agents, such as diamyl sodium sulfosuccinate, sorbitan mono-laurate, sodium 2-ethyl-n-heptyl sulfate, and the like, that have hydrophillic and hydrophobic portions in their molecules, making them surface active, have been used in combination with the suspending agents to attain higher degrees of stability. Although these attempts have all met with more or less limited success, none of them has succeeded in eliminating all of the previously enumerated undesirable qualities of the polymeric products.

Applicant has discovered an improved process for the suspension polymerization of vinyl monomers which comprises conducting said polymerization in the presence of a suspending agent comprising certain products of the condensation of polyethylene glycol with the diglycidyl ether of bisphenol A. The polymeric product produced according to the process of the instant invention possesses greatly improved properties. For example, vinyl chloride, when polymerized according to the process of this invention, forms free-flowing polymer particles having uniform particle size. Furthermore, the poly(vinyl chloride) particles have a high, uniform level of porosity which permits rapid plasticization and low processing temperatures while minimizing fisheye formation in films produced therefrom. Vinyl acetate polymers produced according to the process of this invention are free from dust and "scrap" and dissolve in various organic solvents without the formation of insoluble gels. A resinous product that can be molded under heat and pressure to form articles having uniform physical properties without discoloration of the resin is obtained when vinyl acetate is polymerized alone, or when it is copolymerized with vinyl chloride according to my process.

The use of the condensation products described herein as suspending agents in the process of this invention also increases the productivity of vinyl polymerizations. For example, vinyl chloride having a high level of porosity is obtained with substantially complete conversion of monomer to polymer, whereas prior processes had to be stopped at low degrees of conversion to obtain polymers having desirable properties. In addition to this increase in productivity, the need for careful analytical control of the conversion is made unnecessary because the polymerization can be permitted to run to completion. Furthermore, the surfaces of the equipment employed in the polymerization conducted according to the process of this invention remain substantially free of polymer build-up and ivory formation.

The process of this invention essentially comprises heating a mixture containing a vinyl monomer component, an azo, peroxygen or other suitable polymerization catalyst, water and a suspending agent, as set forth below, at polymerization temperatures with vigorous agitation in a suitable reaction vessel. After the desired degree of polymerization has been attained, the polymeric product can be recovered by conventional steps; for example, by filtration of the product from the reaction mixture, centrifugation to remove the majority of the liquid and, finally, oven drying. As used herein, the term "vinyl monomer" includes single vinyl monomers such as vinyl chloride, vinyl acetate, styrene, vinyl propionate, methyl methacrylate, maleic anhydride, and vinylidine chloride, and mixtures of two or more of such vinyl monomers, such as vinyl chloride-vinyl acetate, vinyl chloride-vinyl acetate-maleic anhydride, vinyl chloride-vinyl acetate-vinyl alcohol, and vinyl chloride-vinylidine chloride mixtures.

The suspending agents which are employed in the process of this invention are water-soluble products of the condensation of polyethylene glycol with the diglycidyl ether of bisphenol A [diglycidyl ether of 2,2-bis(4-hydroxyphenyl)-propane] having reduced viscosities of from about 0.3 to about 0.6, with reduced viscosites of from about 0.35 to about 0.45 being preferred. These products can be prepared by heating polyethylene glycol that has a reduced viscosity of from about 0.08 to about 0.22, and preferably of about 0.17, to a temperature of about 115° C. in an inert atmosphere. About 0.2 weight percent to about 5 weight percent, and preferably from about 0.2 weight percent to about 1 weight percent, based on the weight of polyethylene glycol charged, of a 50 percent aqueous solution of sodium hydroxide or potassium hydroxide and from about 1 weight percent to about 4 weight percent, and preferably from about 3.0 to about 3.5 weight percent, based upon the weight of polyethylene glycol, of the diglycidyl ether of bisphenol A are added. The resulting mixture is heated at about 115° C. for a time sufficient to obtain a polymer having the desired reduced viscosity. The reaction mixture is then neutralized with an acid, such as phosphoric acid. About 0.01 to about 0.2 weight percent, based upon the weight of polyethylene glycol charged, of an antioxidant, such as the monomethyl ether of hydroquinone, can be added if desired. The resulting mixture is then cooled to room temperature, whereby the condensation product solidifies, after which it is broken up into chips.

The reduced viscosities of both the polyethylene glycol and the condensation product employed as the suspending agent in the process of this invention are calculated from the following equation:

$$\text{Reduced viscosity} = I_R = \frac{I - I_0}{\frac{I_0}{C}}$$

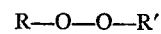

wherein I is the viscosity at 30° C. of a solution containing 0.20 gram of a polyethylene glycol-containing polymer in 100 milliliters of acetonitrile, $I_0$ is the viscosity at 30° C. of pure acetonitrile and C is the concentration of said polymer in the solvent in grams per 100 ml. and is 0.2 gram/100 ml.

In general, the concentration of the suspending agent in the polymerization mixture charged to the reactor can vary from about 0.05 to about 2 weight percent, based upon the total weight of the monomer or co-monomers employed. Higher concentrations than about 2 weight percent can be employed but give no particular advantage. Concentrations less than about 0.05 weight percent are relatively ineffective and for that reason are undesirable. The particular concentration of suspending agent to be employed depends on several variables, including the rate of polymerization, the degree of agitation of the reaction mixture, the monomer-to-water ratio, and the desired particle size of the polymeric product. Thus, the greater the rate of polymerization, the more suspending agent is required; the greater the degree of agitation, the less suspending agent is required; the higher the monomer-to-water ratio, the more suspending agent is required; and larger particles result when less suspending agent is employed. Furthermore, the type of monomer being polymerized appears to affect the required concentration of suspending agent. Although concentrations of from about 0.2 to about 0.5 weight percent have been found to be preferable when polymerizing vinyl chloride or vinyl acetate alone, concentrations of about 1 weight percent were found most effective in the preparation of copolymers of vinyl chloride and vinyl acetate.

The polyethylene glycol-diglycidyl ether condensation product can be added to the initial polymerization mixture or after polymerization has begun. If the latter procedure is employed the amount of condensation product required to attain the advantages of the process of the instant invention is increased. For example, about 0.23 weight percent of the condensation product, based upon the weight of the monomer charged, is required to provide a satisfactory product when it is added to vinyl acetate polymerizations at a conversion of from about 10 to about 20 percent of the monomer to polymer, but about 0.58 weight percent, based upon the monomer, is required when added at about 30 percent conversion of vinyl acetate to its polymer.

The suspending agent used in the process of this invention can be added either as a solid or in an aqueous solution. The latter procedure is preferred, particularly when the suspending agent is added subsequent to the initiation of polymerization.

The water to monomer ratio for the polymerization of this invention may vary from about 1:1 to about 100:1 or more by weight, although ratios of greater than 4:1 are generally uneconomical. In general, it is preferred that there is present more water than monomer, for if there is less than about 1 part by weight of water to 1 part by weight of monomer, the suspension stability is destroyed because of the inversion of the two phases. The preferred weight ratios of water to polymer are from about 1:1 to about 10:1 with the most preferred being from about 5:1 to about 3.5:1, depending on the monomer to be polymerized.

The catalysts that are employed in the process of the instant invention are any of those compounds known in the art as catalysts for vinyl polymerizations. Suitable catalysts include the azo and the peroxygen compounds.

Peroxygen compounds which can be used as catalysts in the process of this invention can be illustrated by the following structural formula:

R—O—O—R' wherein R and R' are selected from the group consisting of hydrogen, alkyl, acyl, and benzoyl and R and R' are the same or different. Examples of such compounds include benzoyl peroxide, lauroyl peroxide, propionyl peroxide, dicaproyl peroxide, acetyl benzoyl peroxide, diacetyl peroxide, p-tertiary-butyl perbenzoate, tertiary-butyl perlaurate, tertiary-butyl hydroperoxide and ditetiary-butyl peroxide.

Azo compounds that can be employed as catalysts in the process of this invention can be illustrated by the following structural formula:

R—N=N—R'

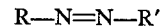

wherein R and R' are selected from the group consisting of alkyl, acyl, alkylnitrile, and alkyl alkylate and R and R' can be the same or different. Examples of such compounds include alpha, alpha-azodiisobutyronitrile, dimethyl-alpha,alpha-azodiisobutyrate, and the like.

The concentration of the catalyst in the polymerization mixture can vary from about 0.01 to about 2.0 percent by weight of the monomer. Concentrations in the range of from about 0.1 to about 0.5 percent are preferred, however.

The polymerization can be carried out at temperatures of from about 0° C. to about 125° C., but it is preferably conducted at a temperature of from about 40° C. to about 90° C. The polymerizations are generally carried out at autogenous pressures developed in the reactor. Pressures greater than autogenous pressures can be used, if desired, but are not ordinarily necessary.

The polymerization of vinyl compounds by the process of this invention is preferably carried out in an oxygen-free atmosphere, since oxygen acts as a polymerization inhibitor. An inert atmosphere, such as a nitrogen atmosphere or an atmosphere of the vinylic monomer being polymerized, can be used.

Conventional, well known emulsifying or wetting agents can also be employed in the process of this invention. Examples of such wetting agents are the common soaps, sodium salts of long-chain carboxylic and sulfonic acids, halogen salts of long-chain amines, alkylated aromatic sulfonic acids and sulfonates, long-chain alkyl sulfates and the like. Specific examples include diamyl sodium sulfosuccinate, dibutyl sodium sulfosuccinate, dihexyl sodium sulfosuccinate, sorbitan monolaurate, sodium lauryl sulfate, sodium 2-ethyl-n-heptyl sulfate, sodium tetradecyl sulfate, dodecylammonium chloride and the like. The amount of such emulsifying or wetting agents that is employed in the process of this invention can be from about 0.01 to about 0.5 weight percent, based upon the weight of the vinyl monomer component. In general, the amount of emulsifying or wetting agent employed is less than the amount of suspending agent employed. Care must be taken that excessive amounts of the wetting agent are not employed, since an excess generally impairs the stability of the suspension and large polymeric aggregates and dust are formed. Thus, it is preferred to use concentrations of the wetting agent of from about 0.01 to about 0.25 weight percent, based upon the weight of the vinyl monomer component.

In a preferred embodiment of the process of this invention, a reactor is charged with the vinyl monomer component to be polymerized, water, a catalyst, a wetting agent, and the suspending agent herein described having a reduced viscosity of from about 0.35 to about 0.45. The weight ratio of vinyl monomer component to water is from about 1:3.5 to about 1:5. The weight ratio of vinyl monomer component to catalyst is from about 100:0.1 to about 100:0.5. The weight ratio of the vinyl monomer component to the wetting agent is from about 100:0.01 to about 100:0.25 and the weight ratio of vinyl monomer component to suspending agent is from about 100:0.2 to about 100:0.5. After flushing the reaction vessel with nitrogen, the vessel is sealed and the reaction mixture is heated at polymerization temperatures with constant agitation for a time sufficient to permit the desired degree of polymerization. The reaction mixture is then cooled, removed from the reactor, and the polymeric material is filtered out of the mixture. The particles so obtained are further dried by centrifugation and oven drying at about 60° C.

The following examples further serve to illustrate the process of this invention.

EXAMPLE I

Into each of two 50-milliliter Pyrex glass bombs were placed 24 milligrams of dilauroyl peroxide. Then 3.6 milliliters of an aqueous solution containing 1.0 weight percent of a condensation product of polyethylene glycol with the diglycidyl ether of bisphenol A, said condensation product containing about 3 weight percent of combined diglycidyl ether of bisphenol A, based upon the weight of combined polyethylene glycol, and having a reduced viscosity of about 0.4, were added to each bomb followed by the addition of 14.4 milliliters of distilled water. Approximately 12½ grams of liquid vinyl chloride monomer were then added to each bomb and a portion of the vinyl chloride was evaporated off to purge the bombs of air. The bombs were capped when the weight of vinyl chloride remaining in the bomb was 12.0 grams. Thus, each charge contained vinyl chloride and water in the weight ratio of about 2:3 and an amount of the polyethylene glycol-diglycidyl ether of bisphenol A condensation product equal to 0.3 percent of the weight of the vinyl chloride. The bombs were placed in a water bath maintained at 50° C. and rotated at the rate of thirty-two revolutions per minute for seventeen hours. The bombs were then removed from the bath, cooled, the caps removed, and the poly(vinyl chloride) was separated from the water by filtration and oven dried in an air oven at a temperature of 60° C. Poly(vinyl chloride) was obtained from each bomb in a yield of about 10 grams and had a bulk density of 21.2 pounds per cubic foot.

Microscopic examination revealed that the particles were spherical, had an average diameter of about 250 microns and were free of fine particles and scrap. The particles were plasticized with di-2-ethylhexyl phthalate (DOP) plasticizer by adding several drops of the plasticizer to resin particles contained on a microscope slide. The particles were then observed under a microscope, using transmitted light, and were seen to absorb the plasticizer rapidly and uniformly. No particles were found which did not absorb the plasticizer at room temperature.

Poly(vinyl chloride) was prepared under identical conditions, except that two different suspending agents, poly(vinyl alcohol) and carboxymethyl cellulose, were used in place of the polyethylene glycol-diglycidyl ether of bisphenol A condensation product. A large number of the poly(vinyl chloride) particles so produced would not absorb DOP plasticizer at room temperature, indicating a non-uniform product. Furthermore, a large amount of the product consisted of very fine particles, which cause dusting on handling.

EXAMPLE II

A charge containing 52.8 pounds of water, 36.7 pounds of liquid vinyl chloride, 50 grams of dilauroyl peroxide, and one liter of an aqueous solution containing 5 weight percent of the condensation product of polyethylene glycol with the diglycidyl ether of bisphenol A containing about 3 weight percent of combined diglycidyl ether of bisphenol A, based upon the weight of combined polyethylene glycol, said condensation product having a reduced viscosity of about 0.4, was placed in a 10-gallon, stainless steel autoclave which had been purged with oxygen-free nitrogen. The autoclave was equipped with four baffles and two 7-inch turbine impellers which were run at a speed of 250 revolutions per minute. The charge was heated at 50° C. for thirteen hours to polymerize the vinyl chloride. The poly(vinyl chloride) was blown into a receiver, filtered, and dried in a tray drier at 60° C. The yield was about 36 pounds of poly(vinyl chloride) beads. No "ivory" formation or polymer build-up on the interior surfaces of the autoclave was observed.

The poly(vinyl chloride) had a median particle size of 150 microns, a high and uniform degree of absorption of DOP plasticizer and exhibited no fisheyes or hard particles after plasticization and calendering.

EXAMPLE III

A charge containing 1400 parts by weight of water, 1.2 parts by weight of benzoyl peroxide, and 600 parts by weight of vinyl acetate monomer was placed in a glass reaction vessel equipped with an agitator and a reflux condenser. The mixture was agitated vigorously and heated at the reflux temperature (67° C.) to effect polymerization. At 20 percent conversion of monomer to polymer, 1.38 parts by weight of the condensation product of polyethylene glycol with the diglycidyl ether of bisphenol A containing about 3 weight percent of combined diglycidyl ether of bisphenol A, based upon the weight of combined polyethylene glycol, said condensation product having a reduced viscosity of 0.395, were charged to the vessel. Polymerization was continued at the reflux temperature until substantially complete conversion of the monomer to the polymer was attained. The reaction mixture was cooled, discharged from the reactor and the granular poly(vinyl acetate) which was removed was water-washed, centrifuged, and oven-dried at 60° C. for sixteen hours. The yield of poly(vinyl acetate) was 594 parts by weight. The walls of the reactor and the agitator shaft were free of "ivory" or resin scrap.

The dried beads of poly(vinyl acetate) were free-flowing and possessed a size range of 0.5 to 0.9 millimeter with a median size of 0.7 millimeter. The total solids content of the beads was greater than 99 percent. The viscosity of a one molar solution of the polymer in benzene was 51 centipoises at 20° C. Clear, colorless solutions, free of insoluble gels, were obtained when the polymer was dissolved in benzene, butyl acetate, and methyl ethyl ketone.

Poly(vinyl acetate) beads that were prepared in a similar manner, except that the suspending agent employed was poly(vinyl alcohol), had an average diameter of 0.4 millimeter. Considerable gel formation was observed in solutions of the poly(vinyl acetate) beads in benzene, butyl acetate, and methyl ethyl ketone.

EXAMPLE IV

A charge containing 174 pounds of water and 0.05 pound of the condensation product of polyethylene glycol with the diglycidyl ether of bisphenol A containing about 3 weight percent of combined diglycidyl ether of bisphenol A, based upon the weight of combined polyethylene glycol, said condensation product having a reduced viscosity of 0.395, was placed in a 35-gallon, glass-lined, jacketed autoclave, equipped with a three-bladed, anchor-type agitator that rotated at a speed of 200 revolutions per minute. The reaction mixture was heated to 40° C., thirty-five pounds of vinyl acetate and 0.70 pound of benzoyl peroxide were added, and the temperature was raised to 75° C. After thirty-five minutes at this temperature, an additional eighty-one pounds of vinyl acetate were fed to the reactor at a rate of 0.92 pound per minute. An additional 0.30 pound of the polyethylene glycol-diglycidyl ether of bisphenol A condensation product were added at the time when approximately 30 percent conversion of the monomer to polymer had occurred, and the polymerization was continued to essentially complete conversion of monomer to polymer. The poly(vinyl acetate) beads formed were removed from the reaction medium by distilling off the unreacted monomer. The beads were then water-washed, centrifuged, and dried in a conventional forced-air drier at 60° C.

The poly(vinyl acetate) beads weighed 114 pounds, were spherical in shape and had a median diameter of 1 millimeter with a standard deviation of 0.16 millimeter. The walls of the reactor and the agitator shaft and blades were free from scrap and ivory.

A portion of the poly(vinyl acetate) was stored unagitated in the mother liquor for twelve days without noticeable agglomeration—a desirable property since any agglomeration or "caking" would interfere with the further manufacture and processing of the beads. A one molar solution of the polymer in benzene was clear and free from gels and possessed a viscosity of 24 centipoises at 20° C. Conventionally prepared poly(vinyl acetate) produces solutions in benzene having about the same viscosity but which are often contaminated with gels.

EXAMPLE V

In a manner similar to that described in Example IV, a copolymer containing 86 weight percent of combined vinyl chloride and 14 weight percent of combined vinyl acetate was prepared by suspension polymerization in a 10-gallon autoclave using 1.0 weight percent, based on the total weight of the vinyl chloride and vinyl acetate monomers, of the condensation product of polyethylene glycol with the diglycidyl ether of bisphenol A containing about 3 weight percent of combined diglycidyl ether of bisphenol A, based upon the weight of combined polyethylene glycol, said condensation product having a reduced viscosity of 0.395.

The resulting vinyl acetate-vinyl chloride copolymer gave a clear, colorless, gel-free solution in methyl ethyl ketone. A plaque formed from the copolymer was clear and colorless. A plaque molded under identical conditions from a similar copolymer made under the same conditions, but using poly(vinyl alcohol) as the suspending agent during polymerization, exhibited a pinkish-brown color because of resin decomposition.

EXAMPLE VI

Using the procedure and the same starting materials as are described in Example II but substituting dipropionyl peroxide for dilauroyl peroxide and adding 0.10 weight percent of the monomer of sorbitol monolaurate, a well-known, conventional wetting agent, poly(vinyl chloride) was prepared. Substantially complete conversion of the monomer to the polymer was observed. The autoclave was free of ivory or polymer buildup.

The dried poly(vinyl chloride) particles had an average particle size of 92 microns. A high and uniform level of absorption of DOP plasticizer was observed. A calendered sheet of the plasticized product exhibited good color stability and a very low level of fisheye formation.

Additional examples, in which vinyl acetate was polymerized employing the materials and procedures described in Example III, except that variations were made in the time of addition and the effective concentration of the condensation product of polyethylene glycol with the diglycidyl ether of bisphenol A, are set forth in Table I below.

*Table I*

SUSPENSION POLYMERIZATION OF VINYL ACETATE

| Example No. | Suspending Agent | | Total Yield of Beads, Wt. Percent | Resin Scrap on No. 4 Mesh, Wt. Percent | Bead Diameter | | Gels in Resin-Benzene Solution |
|---|---|---|---|---|---|---|---|
| | Concentration, Wt. Percent (monomer basis) | Time of Addition, After Initial Reflux, Min.[a] | | | Median Size, mm. | Standard Deviation, mm. | |
| VII | 0.18 | [b] 20 | | | | | |
| VIII | 0.23 | 10 | 80 | 8 | 0.7 | 0.2 | Nil |
| IX | 0.23 | 20 | 89 | 5 | 0.5 | 0.2 | Nil |
| X | 0.23 | 30 | 75 | 20 | 1.7 | 0.7 | Nil |
| XI | 0.58 | 30 | 95 | 4 | 0.9 | 0.4 | Nil |

[a] The time of addition (in minutes) of the suspending agent to the reaction corresponds to the approximate degree of conversion of monomer to polymer at the time of addition.
[b] Unstable suspension.

From Table I it can be seen that a concentration of above about 0.2 weight percent of the polyethylene glycol-diglycidyl ether of bisphenol A condensation product, based on the weight of vinyl acetate, is required to maintain a stable suspension of vinyl acetate in water. Smaller concentrations of the suspending agent can be employed at the beginning of the polymerizations, but the concentration must be increased during the progress of the polymerization of vinyl acetate so that there is at least 0.2 weight percent of the suspending agent, based upon the weight of the vinyl monomer component charged, at a degree of conversion of from about 10 to about 20 percent of the monomer to the polymer. If the additional suspending agent is not provided the suspension becomes unstable and large polymeric aggregates and dust are formed.

At a suspending agent concentration of 0.23 percent, the time of the addition of the suspending agent was varied such that the addition was performed at 10, 20, or 30 percent conversion of monomer to polymer. This time of addition affected both the median diameter and the uniformity of size of the poly(vinyl acetate) beads formed. The addition of the suspending agent at 10, 20, or 30 weight percent conversion resulted in bead diameters of 0.7, 0.5 and 1.7 millimeters, respectively. The standard deviation also increased as the time of addition of the suspending agent was delayed, the deviation being 0.2 millimeter for additions at 10 and 20 percent conversion but being 0.7 millimeter when the addition was made at 30 percent conversion. Higher concentrations of suspending agent caused a reduction of both the median diameter and the standard deviation. When 0.58 weight percent of the suspending agent was added at 30 percent conversion of monomer to polymer, a median diameter of 0.9 millimeter and a standard deviation of 0.4 millimeter were obtained, both of which are lower than when only 0.23 weight percent of suspending agent was added at 30 percent conversion.

The amount of resin scrap present in the polymeric product was also found to be a function of both the concentration and the time of addition of the suspending agent of this invention. Thus, as the suspending agent was added at higher degrees of conversion of monomer, the amount of scrap formed increased from 8 percent and 5 percent for additions made at conversions of 10 and 20 percent, respectively, to 20 percent when the addition was made at 30 percent conversion of monomer to polymer. The amount of scrap was greatly reduced with a higher concentration of suspending agent. When 0.58 percent of the weight of vinyl chloride of suspending agent was added at 30 percent conversion of monomer to polymer, the scrap in the product was only 4 percent as compared to 20 percent when 0.23 weight percent of the vinyl acetate of suspending agent was added at 30 percent conversion, thus demonstrating the importance of adding a sufficient amount of the suspending agent early in the course of the polymerization reaction.

When concentrations of the suspending agent of from about 0.2 weight percent or more based upon the weight of the vinyl monomer component, are employed at the beginning of the polymerization, very small polymeric particles, which are of little value, are obtained. Thus, it is preferred either to employ from about 0.05 to about 0.20 weight percent of the suspending agent, based on the weight of vinyl acetate, in the initial charge, and then increase the amount of suspending agent to from about 0.2 to about 2 weight percent, based upon the amount of vinyl acetate charged, at a degree of conversion of monomer to polymer of from about 10 to about 30 percent, or to add all the suspending agent after about 10 to about 30 percent conversion of monomer has occurred. Where the latter procedure is employed it will be necessary to employ greater amounts of the suspending agent as the degree of conversion at the time of addition of the suspending agent increases. For example, only 0.2 weight percent of the suspending agent is required when it is added at degrees of conversion of from about 10 to about 20 percent to provide a satisfactory product. But, when the degree of conversion of monomer to polymer is as high as 30 percent when the suspending agent is added, about 0.6 weight percent, based upon the weight of the vinyl acetate charged, is required to produce a satisfactory product.

The reactor employed in Examples VII–XI was uniformly clean and free from resin scale after the vinyl acetate polymerizations were carried out using the polyethylene glycol-diglycidyl ether of bisphenol A condensation product as the suspending agent. Solutions of polyvinyl acetate in benzene were gel-free.

Poly(vinyl acetate) prepared by employing similar conditions and procedures, except that hydroxyethyl cellulose or polyvinyl alcohol were used as the suspending agents, contained up to 38 percent scrap at optimum polymerization conditions. The beads had average particle diameters of less than ½ millimeter with a range of from 0.05 to 10 millimeters.

Employing similar procedures polymers of styrene, vinyl propionate, methyl methacrylate, maleic anhydride, vinylidine chloride and copolymers of vinyl chloride and vinylidine chloride, vinyl chloride, vinyl acetate and maleic anhydride, and vinyl chloride, vinyl acetate and vinyl alcohol are prepared employing the condensation product of polyethylene glycol and the diglycidyl ether of bisphenol A as a suspending agent.

What is claimed is:

1. In a process for the suspension polymerization of a vinyl monomer the improvement which comprises polymerizing said vinyl monomer in an aqueous suspension containing from about 0.05 weight percent to about 2 weight percent, based upon the weight of said vinyl monomer, of a suspending agent, said suspending agent comprising a water soluble condensation product of polyethylene glycol with the diglycidyl ether of 2,2-bis(4-hydroxyphenyl) propane, said condensation product containing from about 1 weight percent to about 4 weight percent of combined diglycidyl ether of 2,2-bis(4-hydroxyphenyl)propane, based upon the weight of combined polyethylene glycol, and having a reduced viscosity of from about 0.3 to about 0.6.

2. In a process for the suspension polymerization of a vinyl monomer selected from the group consisting of vinyl chloride, vinyl acetate, and mixtures thereof, the improvement which comprises polymerizing said vinyl monomer in an aqueous suspension containing from about 0.05 weight percent to about 2 weight percent, based upon the weight of said vinyl monomer, of a suspending agent, said suspending agent comprising a water soluble condensation product of polyethylene gylcol with the diglycidyl ether of 2,2-bis(4-hydroxyphenyl)propane, said condensation product containing from about 1 weight percent to about 4 weight percent of combined diglycidyl ether of 2,2-bis(4-hydroxyphenyl)propane, based upon the weight of combined polyethylene glycol, and having a reduced viscosity of from about 0.3 to about 0.6.

3. In a process for the suspension polymerization of a vinyl monomer selected from the group consisting of vinyl chloride, vinyl acetate, and mixtures thereof, the improvement which comprises polymerizing said vinyl monomer in aqueous suspension containing from about 0.05 weight percent to about 2 weight percent, based upon the weight of said vinyl monomer, of a suspending agent, said suspending agent comprising a water soluble condensation product of polyethylene glycol with the diglycidyl ether of 2,2-bis(4-hydroxyphenyl) propane, said condensation product containing from about 1 weight percent to about 4 weight percent of combined diglycidyl ether of 2,2-bis(4-hydroxyphenyl)propane, based upon the weight of combined polyethylene glycol, and having a reduced viscosity of from about 0.3 to about 0.6 and wherein the vinyl monomer to water weight ratio in the charge is from about 1:1 to about 1:10.

4. In a process for the suspension polymerization of a vinyl monomer selected from the group consisting of vinyl chloride, vinyl acetate, and mixtures thereof, the improvement which comprises polymerizing said vinyl monomer in aqueous suspension containing from about 0.05 weight percent to about 2 weight percent, based upon the weight of said vinyl monomer, of a suspending agent, said suspending agent comprising a water soluble condensation product of polyethylene glycol with the diglycidyl ether of 2,2-bis(4-hydroxyphenyl)propane, said condensation product containing from about 3 weight percent to about 3.5 weight percent of combined diglycidyl ether of 2,2-bis(4-hydroxyphenyl)propane, based upon the weight of combined polyethylene glycol, and having a reduced viscosity of from about 0.35 to about 0.45 and wherein the vinyl monomer to water weight ratio in the charge is from about 1:1 to about 1:10.

5. In a process for the suspension polymerization of vinyl chloride the improvement which comprises polymerizing said vinyl chloride in aqueous suspension containing from about 0.05 weight percent to about 2 weight percent, based upon the weight of vinyl chloride, of a suspending agent, said suspending agent comprising a water soluble condensation product of polyethylene glycol with the diglycidyl ether of 2,2-bis(4-hydroxyphenyl)propane, said condensation product containing from about 3 weight percent to about 3.5 weight percent of combined diglycidyl ether of 2,2-bis(4-hydroxyphenyl)propane, based upon the weight of combined polyethylene glycol, and having a reduced viscosity of from about 0.35 to about 0.45 and wherein the vinyl chloride to water weight ratio in the charge is from about 1:1 to about 1:10.

6. In a process for the suspension polymerization of vinyl acetate the improvement which comprises polymerizing said vinyl acetate in aqueous suspension containing from about 0.05 weight percent to about 2 weight percent, based upon the weight of vinyl acetate, of a suspending agent, said suspending agent comprising a water soluble condensation product of polyethylene glycol with the diglycidyl ether of 2,2-bis(4-hydroxyphenyl)propane, said condensation product containing from about 3 weight percent to about 3.5 weight percent of combined diglycidyl ether of 2,2-bis(4-hydroxyphenyl)propane, based upon the weight of combined polyethylene glycol, and having a reduced viscosity of from about 0.35 to about 0.45 and wherein the vinyl acetate to water weight ratio in the charge is from about 1:1 to about 1:10.

7. In a process for the suspension copolymerization of a mixture of vinyl acetate and vinyl chloride the improvement which comprises copolymerizing said vinyl acetate and vinyl chloride in aqueous suspension containing from about 0.05 weight percent to about 2 weight percent, based upon the weight of said monomers, of a suspending agent, said suspending agent comprising a water soluble condensation product of polyethylene glycol with the diglycidyl ether of 2,2-bis(4-hydroxyphenyl)propane, said condensation product containing from about 3 weight percent to about 3.5 weight percent of combined diglycidyl ether of 2,2-bis(4-hydroxyphenyl)propane, based upon the weight of polyethylene glycol, and having a reduced viscosity of from about 0.35 to about 0.45 and wherein the combined monomer to water weight ratio in the charge is from about 1:1 to about 1:10.

8. In a process for the suspension polymerization of a vinyl monomer the improvement which comprises polymerizing said vinyl monomer in an aqueous suspension containing from about 0.01 to about 0.5 weight percent, based upon the weight of said vinyl monomer of a suspending agent, said suspending agent comprising an emulsifying agent and from about 0.05 weight percent to about 2 weight percent, based upon the weight of said vinyl monomer, of a water soluble condensation product of polyethylene glycol with the diglycidyl ether of 2,2-bis(4-hydroxyphenyl)propane, said condensation product containing from about 1 weight percent to about 4 weight percent of combined diglycidyl ether of 2,2-bis(4-hydroxyphenyl)propane based upon the weight of combined polyethylene glycol, and having a reduced viscosity of from about 0.3 to about 0.6.

9. In a process for the suspension polymerization of a vinyl monomer selected from the group consisting of vinyl chloride, vinyl acetate, and mixtures thereof, the improvement which comprises polymerizing said vinyl monomer in an aqueous suspension containing from about 0.01 to about 0.5 weight percent, based upon the weight of said vinyl monomer, of an emulsifying agent and from about 0.05 weight percent to about 2 weight percent, based upon the weight of said vinyl monomer, of a suspending agent, said suspending agent comprising a water soluble condensation product of polyethylene glycol with the diglycidyl ether of 2,2-bis(4-hydroxyphenyl)propane, said condensation product containing from about 1 weight percent to about 4 weight percent of combined diglycidyl ether of 2,2-bis(4-hydroxyphenyl)propane, based upon the weight of combined polyethylene glycol, and having a reduced viscosity of from about 0.3 to about 0.6.

10. In a process for the suspension polymerization of a vinyl monomer selected from the group consisting of vinyl chloride, vinyl acetate, and mixtures thereof, the improvement which comprises polymerizing said vinyl monomer in aqueous suspension containing from about 0.01 to about 0.5 weight percent, based upon the weight of said vinyl monomer, of an emulsifying agent and from about 0.05 weight percent to about 2 weight percent, based upon the weight of said vinyl monomer, of a suspending agent, said suspending agent comprising a water soluble condensation product of polyethylene glycol with the diglycidyl ether of 2,2-bis(4-hydroxyphenyl)propane, said condensation product containing from about 1 weight percent to about 4 weight percent of combined diglycidyl ether of 2,2-bis(4-hydroxyphenyl)propane, based upon the weight of combined polyethylene glycol, and having a reduced viscosity of from about 0.3 to about 0.6 and wherein the vinyl monomer to water weight ratio in the charge is from about 1:1 to about 1:10.

11. In a process for the suspension polymerization of a vinyl monomer selected from the group consisting of vinyl chloride, vinyl acetate, and mixtures thereof, the improvement which comprises polymerizing said vinyl monomer in aqueous suspension containing from about 0.01 to about 0.5 weight percent, based upon the weight of said vinyl monomer, of an emulsifying agent and from about 0.05 weight percent to about 2 weight percent, based upon the weight of said vinyl monomer, of a suspending agent, said suspending agent comprising a water soluble condensation product of polyethylene glycol with the diglycidyl ether of 2,2-bis(4-hydroxyphenyl)propane, said condensation product containing from about 3 weight percent to about 3.5 weight percent of combined diglycidyl ether of 2,2-bis(4-hydroxyphenyl)propane, based upon the weight of combined polyethylene glycol, and having a reduced viscosity of from about 0.35 to about 0.45, and wherein the vinyl monomer to water weight ratio in the charge is from about 1:1 to about 1:10.

12. In a process for the suspension polymerization of vinyl chloride the improvement which comprises polymerizing said vinyl chloride in aqueous suspension containing from about 0.01 to about 0.5 weight percent, based upon the weight of vinyl chloride, of an emulsifying agent and from about 0.05 weight percent to about 2 weight percent, based upon the weight of vinyl chloride, of a suspending agent, said suspending agent comprising a water soluble condensation product of polyethylene glycol with the diglycidyl ether of 2,2-bis(4-hydroxyphenyl)propane, said condensation product containing from about 3 weight percent to about 3.5 weight percent of combined diglycidyl ether of 2,2-bis(hydroxyphenyl)propane, based upon the weight of combined polyethylene glycol, and having a reduced viscosity of from about 0.35 to about 0.45 and wherein the vinyl chloride to water weight ratio in the charge is from about 1:1 to about 1:10.

13. In a process for the suspension polymerization of vinyl acetate the improvement which comprises polymerizing said vinyl acetate in aqueous suspension containing from about 0.01 to about 0.5 weight percent, based upon the weight of vinyl acetate, of an emulsifying agent and from about 0.05 weight percent to about 2 weight percent, based upon the weight of vinyl acetate, of a suspending agent, said suspending agent comprising a water soluble condensation product of polyethylene glycol with the diglycidyl ether of 2,2-bis(4-hydroxyphenyl)propane, said condensation product containing from about 3 weight percent to about 3.5 weight percent of combined diglycidyl ether of 2,2-bis(4-hydroxyphenyl)propane, based upon the weight of combined polyethylene glycol, and having a reduced viscosity of from about 0.35 to about 0.45 and wherein the vinyl acetate to water weight ratio in the charge is from about 1:1 to about 1:10.

14. In a process for the suspension copolymerization of a mixture of vinyl acetate and vinyl chloride the improvement which comprises copolymerizing said vinyl acetate and vinyl chloride in aqueous suspension containing from about 0.01 to about 0.5 weight percent, based upon the weight of said monomers, of an emulsifying agent and from about 0.05 weight percent to about 2 weight percent, based upon the weight of said monomers, of a suspending agent, said suspending agent comprising a water soluble condensation product of polyethylene glycol with the diglycidyl ether of 2,2-bis(4-hydroxyphenyl)propane, said condensation product containing from about 3 weight percent to about 3.5 weight percent of combined diglycidyl ether of 2,2-bis(4-hydroxyphenyl)-propane, based upon the weight of polyethylene glycol, and having a reduced viscosity of from about 0.35 to about 0.45 and wherein the combined monomer to water weight ratio in the charge is from about 1:1 to about 1:10.

References Cited in the file of this patent
UNITED STATES PATENTS

| | | |
|---|---|---|
| 2,731,444 | Greenlee | Jan. 17, 1956 |
| 2,872,432 | Metzger | Feb. 3, 1959 |